United States Patent [19]

Baran, Jr.

[11] Patent Number: 4,725,004

[45] Date of Patent: Feb. 16, 1988

[54] PORTABLE SPRAY UNIT

[76] Inventor: Walter Baran, Jr., 600 Churchill Ct., Fayetteville, N.Y. 13066

[21] Appl. No.: 892,319

[22] Filed: Aug. 4, 1986

[51] Int. Cl.$^4$ .................. B05B 1/20; A01G 25/09
[52] U.S. Cl. ................... 239/164; 239/159; 239/172
[58] Field of Search ............... 239/146, 159, 164–172

[56] References Cited

U.S. PATENT DOCUMENTS

| | | | |
|---|---|---|---|
| 2,618,509 | 11/1952 | Carlson | 239/168 |
| 2,794,678 | 6/1957 | Busey et al. | 239/164 X |
| 3,565,341 | 2/1971 | Burroughs | 239/169 X |
| 3,815,830 | 6/1974 | Rowan | 239/163 |
| 4,236,673 | 12/1980 | Lake | 239/172 |
| 4,269,356 | 5/1981 | Rose | 239/167 |

Primary Examiner—Andres Kashnikow
Assistant Examiner—Patrick N. Burkhart
Attorney, Agent, or Firm—Chilton, Alix & Van Kirk

[57] ABSTRACT

A portable spray unit having a frame assembly (22), a tank assembly (42), an attachment assembly (40), and a spray system (50). The frame assembly is hitched (26) to the rear (12) of a tractor (10), and cradles the tank assembly. The attachment assembly adjustably supports the upper portion of the frame assembly by means of connections (44,46,48) to the tractor chassis. The spray system is carried by the frame and is fluidly connected to the tank assembly. The spray system includes an electric pump (76) powered by the tractor battery (16), a pressure regulator (80) to adjust and maintain flow intensity, vertical and horizontal bar mounts (52,60) for adjustably mounting the nozzles (64) to provide the desired spray pattern, and articulated nozzles (66) for adjusting the spray direction relative to the bar mounts.

2 Claims, 3 Drawing Figures

PORTABLE SPRAY UNIT

BACKGROUND OF THE INVENTION

This invention pertains generally to apparatus for spraying liquid chemicals and the like from a portable unit.

A wide variety of spray units and tank vehicles are available for commercial agricultural use, but spray units available for domestic use generally do not provide the degree of flexibility and ease of use desired by the part-time farmer or gardner. Such user cannot usually afford a dedicated spray vehicle, but would like to adapt equipment such as a lawn mower, for use as a spray vehicle.

U.S. Pat. No. 3,857,515 discloses a rotary lawn mower having a spray unit detachably mounted thereon, in which the mower engine acts as a blower to pressurize the fluid to be sprayed through nozzles carried on a header mounted on the mower deck. U.S. Pat. No. 2,044,884 discloses a reel mower in which the engine operates a pump that is fluidly connected to a feed line and hand-held nozzle for spraying the fluid. These arrangements do not afford adjustablity in the spray pattern and spray intensity deposited on the ground. Furthermore, these arrangements are more or less permanently attached to the mowers, in that no means are disclosed for rapid detachment and reattachment of the spray units.

U.S. Pat. No. 4,236,673 discloses a portable spray unit carried by a small truck or the like, which has a flat bed for easy mounting of the unit. U.S. Pat. No. 4,089,446 discloses a 55 gallon drum adapted for use as a portable shower unit. These arrangements do not suggest any means for setting the spray pattern by adjusting the nozzle height, nozzle separation distance, or nozzle angle.

U.S. Pat. Nos. 3,143,839 and 3,866,397 represent commercial size units that are not well adapted for domestic use, particularly where it is desirable to detachably mount the unit on a general purpose riding mower or the like.

SUMMARY OF THE INVENTION

Accordingly, it is an object of the present invention to provide a portable spray unit for mounting on a small vehicle or the like, in which the spray pattern and intensity are adjustable.

It is a further object to provide such a spray unit that is easy to mount and dismount from the vehicle.

It is yet another object that the mounting arrangement be universal with respect to riding lawn mowers typically purchased for home use.

These and other objects and advantages are accomplished in accordance with the present invention, by a portable spray unit having a frame assembly, a tank assembly, an attachment assembly, and a spray system. The frame assembly is hitched to the rear of the tractor, and cradles the tank assembly. The attachment assembly adjustably supports the upper portion of the frame assembly by means of connections to the tractor chassis. The spray system is carried by the frame and is fluidly connected to the tank assembly. The spray system includes an electric pump powered by the tractor battery, a pressure regulator to adjust and maintain flow intensity, vertical and horizontal bar mounts for adjustably mounting the nozzles to provide the desired spray pattern, and articulated nozzles for adjusting the spray direction relative to the bar mounts.

BRIEF DESCRIPTION OF THE DRAWINGS

The preferred embodiment of the invention will be described with reference to the accompanying drawings, in which.

DESCRIPTION OF THE PREFERRED EMBODIMENT

Figure 1:
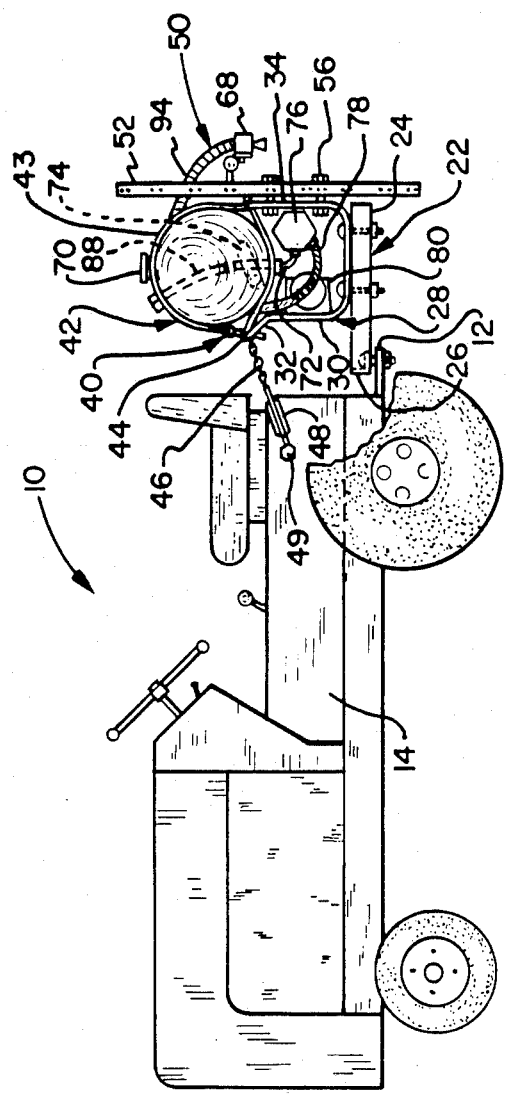
FIG. 1 is an elevation view of a typical tractor lawn mower or the like, with the preferred embodiment of the invention mounted thereon.
Figure 2:
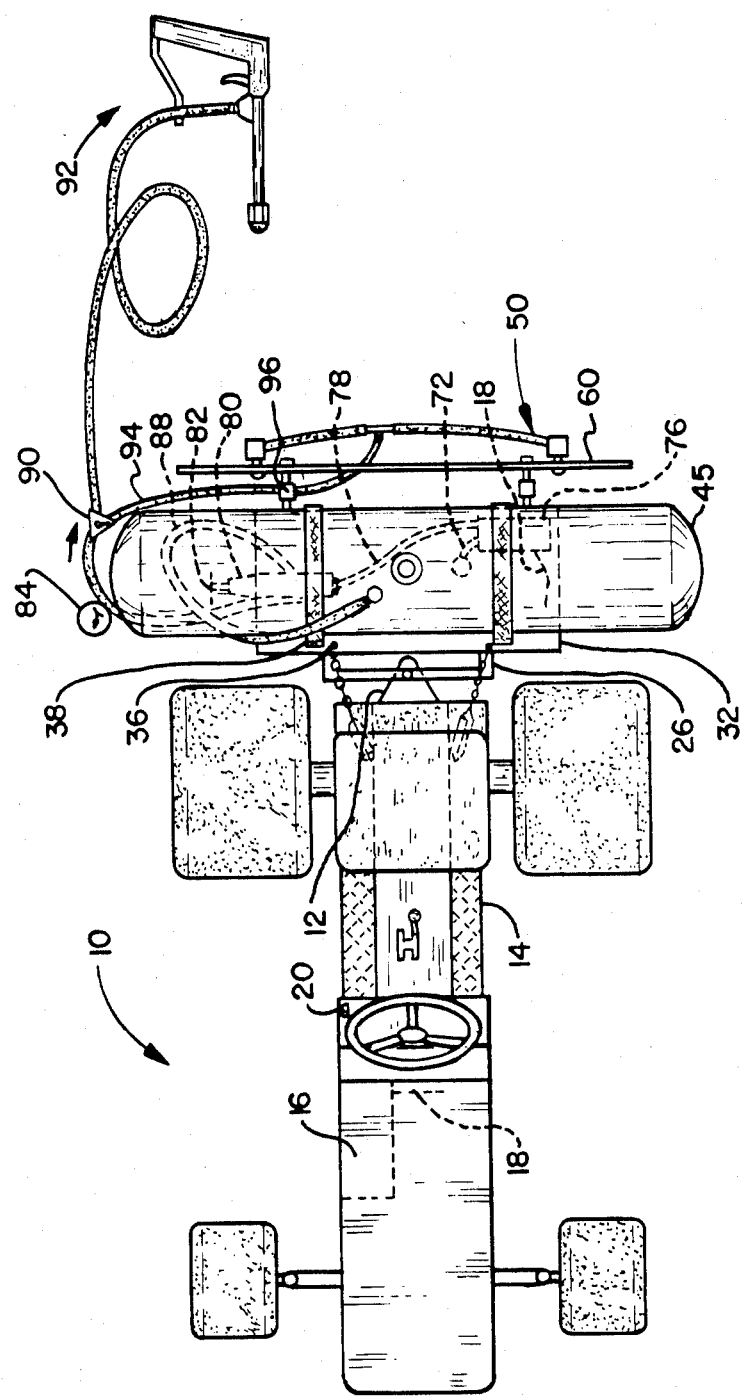
FIG. 2 is plan view of the tractor and spray unit shown in FIG. 1.

FIGS. 1 and 2 show a conventional lawn tractor 10 or the like having a hitch tongue 12, a chassis 14, and an electrical system including battery 16 (shown in phantom). For purposes of the present invention, the electrical system further includes wires 18 and switch 20 for selectively supplying electrical power to the motor in the spray unit as described below in greater detail.

A frame assembly 22 includes a floor 24 having a hitch beam 26 that is pinned to the hitch tongue 12 of the tractor 10. A generally "U" shaped cradle 28 having a front wall 30 including a top rim 32 flared at about 45 degrees, and rear wall 34, is fixedly secured to the floor 24. The cradle 28 has a plurality of holes 36 and slots 38 for attaching a variety of items as described more fully below. The cradle 28 cooperates with the attachment assembly 40 to support the tank assembly 42 within the frame 22, and to support the upper portion of the frame by securing it to the chassis 14 of the tractor 10.

The attachment assembly includes a plurality, preferably a pair, of straps 43 that substantially circumscribe the tank 45, suspending it near the top of the cradle 28 to provide space within the cradle for other components necessary for operating the spray unit. The straps 43 also provide resiliency, acting like shock absorbers for the tank as the tractor is driven along the ground. Preferably, the straps are secured to and/or looped through the front and rear slots 38 on the walls. Means may be provided on the rim 32, to assist in tightening the straps to the desired tension.

The front rim 32 is connected to the tractor chassis 14 by means of a pair of adjustable tension lines such as eye bolts 44, chains 46, turnbuckles 48, and nuts 49. Preferably, the hook on each eye bolt is passed through a hole 36 on the rim, and one end of the turnbuckle is secured by the nut to the mounting bolt (not shown) that is typically found on the chassis generally below the seat on most lawn tractors. The pair of tension lines stabilizes the frame assembly to prevent excessive sway during tractor maneuvering. Thus, it may be seen that the entire spray unit is supported at three points on the tractor.

Figure 3:
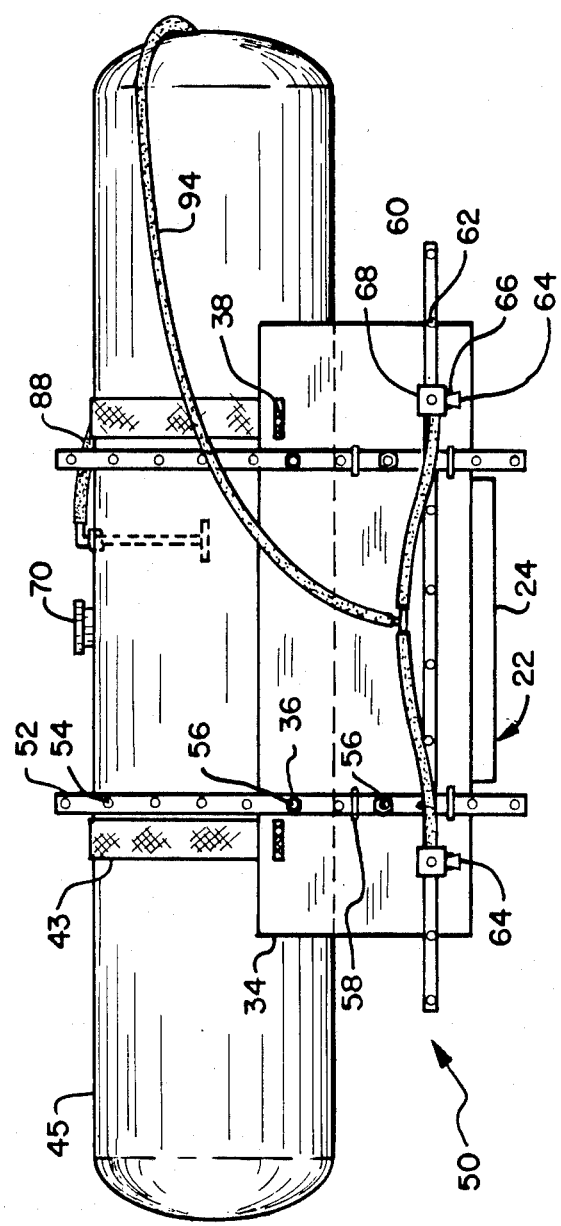
FIG. 3 is an enlarged rear elevation view of the spray unit of FIGS. 1 and 2.

The spray system 50 may best be understood with additional reference to FIG. 3. A pair of spaced vertical mounting bars 52 are bolted or otherwise rigidly connected to the rear wall 34. A plurality of holes 54 in the bars 52 can be selectiveley aligned with holes 36 in the rear wall, to permit adjusting the height of the bars. During such adjustment, prior to tightening of the bolts 56, the bars 52 are guided by bar guides 58. A horizontally mounted spray bar 60 spans the vertical bars 52 and is bolted thereto through a selected pair of holes 62.

The plurality of holes 62 permit the nozzles 64 to be horizontally spaced apart any desired distance, limited only by the length of bar 60. Vertical adjustment of the nozzles can be made by adjusting the vertical bars 52 as described above, or by vertically adjusting the horizontal bar 60 relative to the vertical bars 52. The horizontal and vertical adjustment of the nozzles thus provides selective control of the spray pattern.

The nozzles 64 are preferably mounted on the spray bar 60 by means of nozzle articulators 66 and brackets 68. These permit the nozzle centerlines to be pointed in a selected direction relative to the vertical, providing an additional degree of control on the spray pattern emanating from the spray unit as it passes over the ground.

The tank 45 is filled with fluid after removing cap 70. Suction line 72 and intake filter 74 are located at the bottom of the tank and lead to electric pump 76 which is attached to cradle 28. The pump discharge line 78 is connected to a pressure regulator 80 which is also mounted on the cradle 28. The pressure regulator has a regulator tee 82 for adjusting the pressure as observed on pressure gage 84. The regulator valve 80 operates by diverting and recirculating an appropriate flow of liquid through recirculation line 88 back to tank 45.

The portion of the fluid to be sprayed passes through isolation valve 90, where a selection can be made by the operator to utilize a hand-held spray gun 92 for spraying fruit trees and the like, rather than the spray arrangement mounted on the bars 52,62. The main flow line 94 is supported by bracket 96 as it passes through the bars 52,60, where the flow line enters a header or is merely divided to direct the flow to individual nozzles 64.

It should be appreciated that the invention as described herein may be assembled from well known and readily available components. The unit does not permanently encumber the tractor, as only the switch and wires leading to the motor would preferably remain on the tractor when the unit is disengaged and removed. Removal is accomplished by simply tilting the unit toward the tractor, then disengaging the hooks from the rim and the hitch beam from the hitch tongue. The unit is mounted on the tractor by simply following this procedure in reverse.

Great operating flexibility is afforded by the ability to independently adjust the nozzle height, nozzle separation, nozzle centerline, and fluid discharge pressure. The invention provides the flexibility to spray while cutting with the mower, and to set the spray pattern so that it will closely follow the swath of the mower blade. The preferred means for mounting the unit should be nearly universally compatible with lawn tractors of the type sold for domestic use.

I claim:

1. In combination, a portable tank spray unit detachably mounted on a small tractor lawn mower, comprising:

a frame assembly having a horizontally oriented frame, said frame including a flat floor member, a hitch bar rigidly attached to the floor for pivotally connecting the frame to the rear hitch of the tractor, said frame assembly further including a horizontally extending, U-shaped cradle having a lower portion rigidly secured to said floor and vertically oriented front and rear walls oriented transversely to the direction of travel of the tractor;

an attachment assembly for suspending cradle, said attachment assembly including a plurality of straps passing over and under the tank and through the front and rear walls of the cradle, the weight of the tank being supported by said straps, and a plurality of adjustable tensioning lines connected between the front wall and the chassis of the tractor for connecting the frame assembly to the rear of the tractor;

a spray system carried by the frame, including,
an electric pump having an intake line connected to the tank and having a discharge line, said pump being powered by the tractor battery;
a pressure regulator having an intake from said discharge line and having an outlet forming a main flow line;
a pair of spaced apart vertical bars secured to the rear walls of the cradle and having a plurality of vertically space holes;
a rigid horizontal bar detachably secured to selected holes on the vertical bars and having a plurality of horizontally spaced apart holes;
a plurality of spray nozzles detachably secured to selected holes on the horizontal bar; and
means for connecting the main flow line to the plurality of individual spray nozzles.

2. The spray unit of claim 1, further including means carried on the horizontal bar for adjusting the centerline direction of each nozzle relative to the vertical.

* * * * *